US011336624B2

(12) United States Patent
Haeuser et al.

(10) Patent No.: US 11,336,624 B2
(45) Date of Patent: *May 17, 2022

(54) METHODS AND APPARATUS TO DISTRIBUTE MEDIA CONTENT

(71) Applicant: AT&T Intellectual Property I, LP, Atlanta, GA (US)

(72) Inventors: Anthony A. Haeuser, Aurora, IL (US); Mary McCarthy, San Antonio, TX (US); Scott A. Pettit, San Antonio, TX (US); Christopher A. Lee, San Antonio, TX (US); Roland Noll, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 663 days.

This patent is subject to a terminal disclaimer.

(21) Appl. No.: 15/463,848

(22) Filed: Mar. 20, 2017

(65) Prior Publication Data
US 2017/0195740 A1 Jul. 6, 2017

Related U.S. Application Data

(63) Continuation of application No. 11/382,188, filed on May 8, 2006, now Pat. No. 9,602,512.

(51) Int. Cl.
*G06F 16/74* (2019.01)
*G06F 16/172* (2019.01)
(Continued)

(52) U.S. Cl.
CPC ........ *H04L 63/0428* (2013.01); *G06F 16/172* (2019.01); *G06F 16/43* (2019.01);
(Continued)

(58) Field of Classification Search
CPC .............. H04L 63/107; H04L 63/0428; H04L 63/0876; H04L 63/10; H04N 7/17318;
(Continued)

(56) References Cited

U.S. PATENT DOCUMENTS 5,003,384 A 3/1991 Durden et al.
5,880,769 A 3/1999 Nemirofsky et al.
(Continued)

OTHER PUBLICATIONS

Anderson, "An introduction to IPTV," Ars Technica, Mar. 12, 2006, https://arstechnica.com/business/2006/03/iptv/ (4 pages).
(Continued)

*Primary Examiner* — Marc S Somers

(57) ABSTRACT

Methods and apparatus to distribute media content are disclosed. An example apparatus includes a client interface to receive a request from a wireless communication device for authorization to present media, the media received at the wireless communication device in an encrypted format. A database is to store an association of the wireless communication device and a wired network termination unit. A record interface is to, in response to the request for authorization, query the database based on an identifier of the wireless network communication device to determine whether the wired network termination unit is authorized to receive the media via a wired communication path, and in response to determining that the wired network termination unit is authorized to receive the media via the wired communication path authorize the wireless communication device to decrypt and present the transmitted media.

20 Claims, 5 Drawing Sheets

(51) Int. Cl.

| | |
|---|---|
| *H04N 21/41* | (2011.01) |
| *H04N 21/6334* | (2011.01) |
| *H04L 29/06* | (2006.01) |
| *G06F 16/43* | (2019.01) |
| *G06F 16/951* | (2019.01) |
| *H04N 7/173* | (2011.01) |
| *H04N 21/2347* | (2011.01) |
| *H04N 21/258* | (2011.01) |
| *H04N 21/414* | (2011.01) |
| *H04N 21/426* | (2011.01) |
| *H04N 21/472* | (2011.01) |
| *H04N 21/658* | (2011.01) |
| *H04W 12/069* | (2021.01) |
| *H04W 12/086* | (2021.01) |
| *H04N 21/435* | (2011.01) |
| *H04N 21/643* | (2011.01) |

(52) U.S. Cl.
CPC .......... *G06F 16/74* (2019.01); *G06F 16/951* (2019.01); *H04L 63/0876* (2013.01); *H04L 63/10* (2013.01); *H04L 63/107* (2013.01); *H04N 7/17318* (2013.01); *H04N 21/2347* (2013.01); *H04N 21/25841* (2013.01); *H04N 21/4126* (2013.01); *H04N 21/41407* (2013.01); *H04N 21/42684* (2013.01); *H04N 21/435* (2013.01); *H04N 21/47202* (2013.01); *H04N 21/6334* (2013.01); *H04N 21/64322* (2013.01); *H04N 21/6582* (2013.01); *H04W 12/069* (2021.01); *H04W 12/086* (2021.01); *H04L 63/083* (2013.01); *H04L 2463/101* (2013.01)

(58) Field of Classification Search
CPC ......... H04N 21/2347; H04N 21/25841; H04N 21/4126; H04N 21/6334; G06F 16/74; G06F 16/172
See application file for complete search history.

(56) References Cited

U.S. PATENT DOCUMENTS

| | | | |
|---|---|---|---|
| 5,990,927 | A | 11/1999 | Hendricks et al. |
| 6,557,173 | B1 | 4/2003 | Hendricks |
| 6,674,448 | B1 | 1/2004 | Garahi et al. |
| 6,760,916 | B2 | 7/2004 | Holtz et al. |
| 6,760,918 | B2 | 7/2004 | Rodriguez et al. |
| 6,873,853 | B2 | 3/2005 | Kim |
| 6,950,624 | B2 | 9/2005 | Kim et al. |
| 6,968,568 | B1 | 11/2005 | Hilpert, Jr. et al. |
| 7,350,231 | B2 | 3/2008 | Madison et al. |
| 2001/0039663 | A1 | 11/2001 | Sibley |
| 2001/0051996 | A1 | 12/2001 | Cooper et al. |
| 2002/0069419 | A1 | 6/2002 | Raverdy et al. |
| 2003/0018491 | A1* | 1/2003 | Nakahara ............ G06F 21/10 705/59 |
| 2004/0031058 | A1 | 2/2004 | Reisman |
| 2004/0049567 | A1 | 3/2004 | Manchin |
| 2004/0203712 | A1 | 10/2004 | Murai et al. |
| 2004/0267880 | A1 | 12/2004 | Patiejunas |
| 2005/0033850 | A1 | 2/2005 | Kirkland |
| 2005/0246758 | A1 | 11/2005 | Khandelwal et al. |
| 2005/0273833 | A1 | 12/2005 | Soinio |
| 2005/0283791 | A1 | 12/2005 | McCarthy et al. |
| 2005/0288101 | A1 | 12/2005 | Lockton et al. |
| 2005/0289604 | A1 | 12/2005 | Byers |
| 2006/0009258 | A1 | 1/2006 | Narita et al. |
| 2006/0117379 | A1* | 6/2006 | Bennett ............ H04L 29/06027 726/3 |
| 2006/0195548 | A1 | 8/2006 | Hunter et al. |
| 2006/0259927 | A1 | 11/2006 | Acharya et al. |
| 2007/0107016 | A1 | 5/2007 | Angel et al. |
| 2007/0111717 | A1 | 5/2007 | Mueller et al. |
| 2007/0118648 | A1 | 5/2007 | Millefiorini et al. |
| 2007/0121584 | A1 | 5/2007 | Qiu et al. |
| 2007/0217436 | A1 | 9/2007 | Markley et al. |
| 2007/0239825 | A1 | 10/2007 | Walter |

OTHER PUBLICATIONS

Cisco Systems, Inc., "Cisco 8110 Broadband Termination Unit User Guide," 2001 (16 pages).

Powers, "Placeshifting: Remote Viewing of Home Media," JPowers. IN3.ORG, Jan. 11, 2005, http://in3.org/ipowers/?p=88 (2 pages).

Canadian Intellectual Property Office, "Office Action," issued in connection with Canadian Patent Application No. 2,645,723 dated Feb. 16, 2009 (2 pages).

International Searching Authority, "International Search Report and Written Opinion," issued in connection with International Application No. PCT/US07/06702 dated Jul. 7, 2008 (10 pages).

United States Patent and Trademark Office, "Non-Final Office Action," issued in connection with U.S. Appl. No. 11/382,188 dated Feb. 20, 2008 (19 pages).

United States Patent and Trademark Office, "Final Office Action," issued in connection with U.S. Appl. No. 11/382,188 dated Oct. 23, 2008 (20 pages).

United States Patent and Trademark Office, "Non-Final Office Action," issued in connection with U.S. Appl. No. 11/382,188 dated Mar. 2, 2009 (19 pages).

United States Patent and Trademark Office, "Final Office Action," issued in connection with U.S. Appl. No. 11/382,188 dated Aug. 10, 2009 (17 pages).

United States Patent and Trademark Office, "Non-Final Office Action," issued in connection with U.S. Appl. No. 11/382,188 dated May 25, 2010 (17 pages).

United States Patent and Trademark Office, "Final Office Action," issued in connection with U.S. Appl. No. 11/382,188 dated Nov. 9, 2010 (19 pages).

United States Patent and Trademark Office, "Non-Final Office Action," issued in connection with U.S. Appl. No. 11/382,188 dated Mar. 30, 2011 (16 pages).

United States Patent and Trademark Office, "Final Office Action," issued in connection with U.S. Appl. No. 11/382,188 dated Dec. 5, 2011 (18 pages).

United States Patent and Trademark Office, "Non-Final Office Action," issued in connection with U.S. Appl. No. 11/382,188 dated Feb. 27, 2013 (18 pages).

United States Patent and Trademark Office, "Final Office Action," issued in connection with U.S. Appl. No. 11/382,188 dated Sep. 23, 2013 (19 pages).

United States Patent and Trademark Office, "Non-Final Office Action," issued in connection with U.S. Appl. No. 11/382,188 dated Oct. 28, 2015 (16 pages).

United States Patent and Trademark Office, "Final Office Action," issued in connection with U.S. Appl. No. 11/382,188 dated Feb. 26, 2016 (18 pages).

United States Patent and Trademark Office, "Notice of Allowance," issued in connection with U.S. Appl. No. 11/382,188 dated Nov. 7, 2016 (18 pages).

* cited by examiner

METHODS AND APPARATUS TO DISTRIBUTE MEDIA CONTENT

RELATED APPLICATIONS

This patent arises from a continuation of U.S. patent application Ser. No. 11/382,188, filed on May 8, 2006, entitled "METHODS AND APPARATUS TO DISTRIBUTE MEDIA CONTENT." U.S. patent application Ser. No. 11/382,188 is hereby incorporated herein by reference in its entirety.

FIELD OF THE DISCLOSURE

The present disclosure relates generally to media systems and, more particularly, to methods and apparatus to distribute media content.

BACKGROUND

Interpret protocol television (IPTV) services provide television media content over a broadband network. In general, an IPTV provider receives media content from media content creators and distributes the media content to consumer locations. The IPTV provider then converts the media content into packetized digital media streams. The packetized digital media streams are distributed to consumer locations via an internet protocol (IP) multicast or an IP unicast. The consumer location includes a consumer device that receives the packetized digital media streams and converts the streams into media content suitable for display on a television. Because the consumer device communicates with the IPTV provider over an IP connection, the consumer device can easily transmit data back to the IPTV provider, in other words, the IPTV provider and the consumer device can engage in two-way communication.

As media content distribution technologies, like IPTV, have developed, the ability to integrate media content services has increased. In particular, media content creators have begun to provide media content to cellular telephone services for distribution to the subscribers of the cellular phone service.

DETAILED DESCRIPTION

Figure 1:
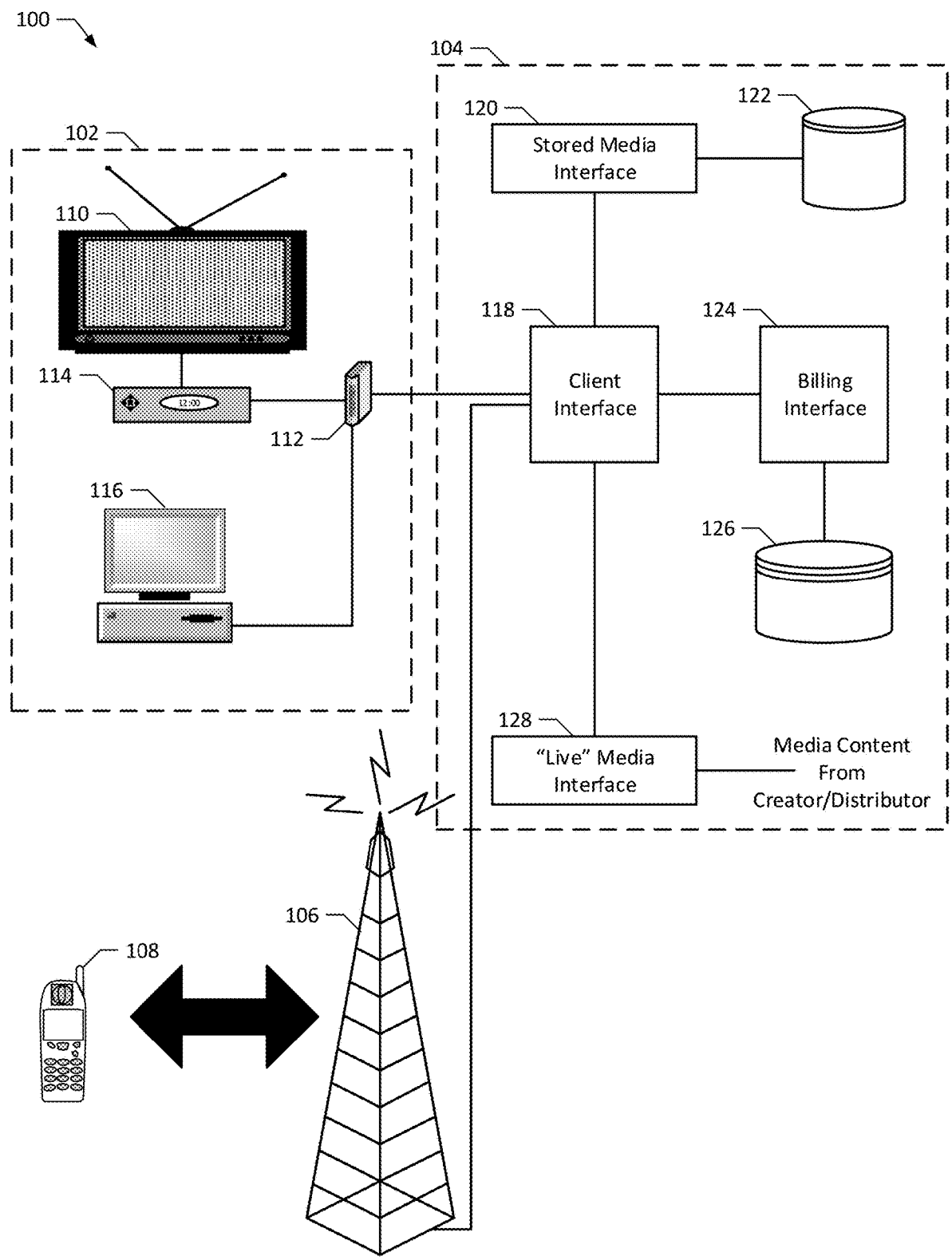
FIG. 1 is a block diagram of an example telecommunication system for distributing media.

An example telecommunication system 100 for distributing media content is illustrated in FIG. 1. The example methods and apparatus described herein may be used to distribute media content to a television connected to a media content receiver and to a mobile device (e.g., a device constructed to be carried by a person (e.g., in a pocket, purse, briefcase, on a belt-clip, etc.) during normal day-to-day activities such as a mobile phone, a Blackberry®, a personal digital assistant (PDA), a laptop computer, a desktop computer, a portable media presentation device, a gaming device, a personal media player, a two-way pager, a moving picture experts group (MPEG) layer three (MP3) player, etc. In the example methods and apparatus, a telecommunication provider manages media content subscriptions for both the television media content receiver and the mobile device. For example, a media content consumer may subscribe to receive media content (e.g., the Home Box Office (HBO) channel) at the consumer's household. If the same consumer attempts to access the media content on a cellular phone, the subscription records associated with the household subscription are queried. After determining that the consumer has already subscribed to receive the media content at their household, the telecommunication system 100 will allow the media content to be presented on the cellular phone. For example, the media content may be the picture-in-picture portion of a media content program. The media content may be provided to the cellular phone with or without a fee in addition to the home subscription fee.

The example telecommunication system 100 of FIG. 1 includes a consumer location 102, a telecommunication network 104, a wireless telecommunication system 106, and a mobile device 108. The example telecommunication system 100 receives media content from media content distributors and/or creators and transmits the media content to the consumer location 102 and the mobile device 108.

The consumer location 102 may be any geographically fixed location where media content is presented. For example, the consumer location 102 may be a household, a business, etc. The example consumer location 102 comprises a television 110, a network terminal unit (NTU) 112, customer premise equipment (CPE) 114, and a personal computer (PC) 116.

Television 110 displays media content received from the CPE 114. The example television 110 may be any type of television such as, for example, a standard definition television, an enhanced definition television, a high-definition television, a cathode ray tube (CRT) television, a liquid crystal display (LCD) television, a plasma television, a projection television, an organic light emitting diode (OLED) television, a surface-conduction electron-emitter display (SED) television, etc. Alternatively, the television 110 may be any other device that is capable of receiving and presenting media content such as, for example, any type of radio receiver/player, a projector, a monitor, a computer, etc.

The NTU 112 communicatively couples the consumer location 102 with the telecommunication network 104. In the example telecommunication system 100, the NTU 112 receives internet protocol (IP) data from the telecommunication system 104 and transmits IP data to the telecommunication system 104. In the illustrated example, the NTU 112 receives IP television (IPTV) media content. The example NTU 112 transmits the IPTV media content to the CPE 114 and/or the computer 116, which are described in further detail below. In the example telecommunication system 100, the NTU 112 and the CPE 114 are discrete devices. However, persons of ordinary skill in the art will recognize that the NTU 112 and the CPE 114 may be integrated in a single device.

The example NTU 112 is an asynchronous digital subscriber line (ADSL) terminal unit-remote (ATU-R). Alternatively, the NTU 112 may be any other communications unit such as, for example, a cable modem, a satellite receiver, an optical network terminal unit (ONT), a symmetrical digital subscriber line (SDSL) terminal unit, an integrated services digital network (ISDN) terminal unit, a high bit-rate digital subscriber line (HDSL) terminal unit, a very high bitrate digital subscriber line (VDSL) terminal unit, an asynchronous transfer mode (ATM) terminal unit, an Ethernet network card, a wireless network card (e.g., a wireless network card that operates according to any of the IEEE 802.11 protocols), a channel service unit (CSU), a data service unit (DSU), a modem, or any other type of communication device.

The example NTU 112 communicates with the CPE 114 and the computer 116 via an Ethernet connection. The NTU 112 may alternatively be connected to the CPE 114 and/or the computer 116 via a wireless network connection, a serial communications connection, a parallel communications connection, a universal serial bus (USB) connection, an IEEE 1394 (FireWire) connection, a high-definition multimedia interface (HDMI) connection, etc. While FIG. 1 illustrates the connections between the NTU 112 and the CPE 114 and the NTU 112 and the computer 116 as direct connections, the connections may alternatively include one or more of a hub, a router, a switch, a gateway, etc. For example, a router may be attached to the NTU 112 and each of the CPE 114 and the computer 116 (as well as any other device) may be connected to the router via a hardwire or wireless connection.

The CPE 114 selects media content received from the telecommunication network 104 and outputs the media content to the television 110. For example, a consumer may request (via a remote control) that the CPE 114 output the content currently presented by HBO. The CPE 114 will send a message (via the NTU 112) to the telecommunication network 104 requesting that the telecommunication network 104 send the HBO media content stream to the consumer location 102 or allow the CPE 114 to connect to the HBO media content stream. When the CPE 114 receives the HBO media content stream, the CPE 114 will output the HBO media content stream to the television. Alternatively, if the CPE 114 receives broadcast media content (e.g., a cable television broadcast), the CPE 114 will use tuning circuitry to extract the HBO media content from the broadcast media content and output the HBO media content to the television 110. The CPE 114 is sometimes referred to as a set-top-box (STB), a residential gateway (RG), a receiver, an integrated receiver/decoder (IRD), or a tuner. As previously described, the CPE 114 and the NTU 112 may be integrated in a single device. As an additional alternative, the CPE 114 may be integrated in the television 110 or the television 110 may include a card-slot for receiving a card that implements the CPE 114.

The computer 116 receives media content via the NTU 112 and executes software that causes media content to be presented on an available display and/or available audio presentation hardware. The computer 116 may additionally connect to networked data sources (e.g., a local computer network, the internet, etc.) via the NTU 112. The computer 116 may be a personal computer (PC), a laptop computer, a notebook computer, a tablet PC, a hand-held computer, a home theatre PC (HTPC), etc. Alternatively, the computer 116 may be a PDA, a gaming device, a portable media presentation device, a portable media player, an MP3 player, mobile phone, etc. While the example computer 116 receives media content via the NTU 112, the computer 116 may additionally or alternatively receive media content via the CPE 114.

In some examples, a consumer may use the computer 116 to access a list of available media content. The consumer may access the list of available media content by visiting a webpage using web browsing software (e.g., Microsoft Internet Explorer®, Mozilla FireFox®, Netscape®, Opera™, etc.) installed on the computer 116. The webpage may or may not be provided over an encrypted or secure connection. The computer 116 may alternatively include dedicated software for requesting and presenting the list of available media content. Once the list of available media content is retrieved and presented, the consumer may select a media content program, stream or broadcast for presentation. The computer 116 requests the media content stream from the telecommunication network 104 via the NTU 114. The requested media content is presented to the consumer via the web browsing software or the dedicated software.

The telecommunication network 104 provides media content services and IP data services to the consumer location 102 and/or, via the wireless telecommunication system 106, to the mobile device 108. The example telecommunication network 104 provides IPTV media content services, but other media types might likewise be appropriate. The telecommunication network 104 comprises a client interface 118, a stored media interface 120, media storage 122, a billing interface 124, a billing storage 126, and a "live" media interface 128.

The client interface 118 is communicatively coupled to the NTU 114 and the wireless telecommunication system 106 to transmit data to and/or receive data from the NTU 114 and the wireless telecommunication system 106. The client interface receives and/or retrieves media content from the media storage 122 via the stored media interface 120 and from the media content creators/distributors via the "live" media interface 128. Based on the available media content, the client interface 118 generates a list of available media content for transmission to consumers. For example, the client interface 118 may transmit a list of available media content to the CPE 114 via the NTU 112. The client interface 118 may receive requests for media content from the CPE 114 via the NTU 112. The client interface 118 also may receive requests for media content from the mobile device 108 via the wireless telecommunication system 106. In response, the client interface 118 transmits the requested media content to the CPE 114 and/or the mobile device 108 via the NTU 112 or the wireless telecommunication system 106, respectively. The client interface 118 may encrypt the media content and/or add copy-protection information to the media content.

Additionally, the client interface 118 receives consumer and device identification information from the CPE 114, the NTU 112, the computer 116, the mobile device 108, and/or the wireless telecommunication network 106. The client interface 118 transfers the consumer and device identification information to the billing interface 124 for authentication. The client interface 118 receives information from the billing interface 124 indicating whether the consumer and device are authorized to access requested media content. For example, the client interface 118 may receive a request for media content including a username/password, a phone number, and/or a device serial number. The client interface 118 extracts the username/password, the phone number, and/or the device serial number and transmits them to the billing interface 124 to determine whether the consumer and/or device associated with the consumer is authorized to access the media content. If the billing interface 124 indicates that the access is authorized, the client interface 124 allows the media content to be transmitted to the requesting device from either the media storage 122 via the stored media interface 120 or the media content creator/distributor via the "live" media interface 128. Alternatively, the billing interface 124 may instruct the client interface 118 to offer and/or grant a license for presentation of the media content the device.

The stored media interface 120 stores media content received from media content creators/distributors in the media storage 122, retrieves the media content when a request is received via the client interface 118, and transmits the media content to requesting devices via the client interface 118. In the illustrated example, the stored media interface 120 is a standalone server. Alternatively, the stored media interface 120 may be integrated with the client interface 118, the billing interface 124, and/or the "live" media interface 128.

The media storage 122 stores retrievable media content for the stored media interface 120. The media storage 122 may be any type of storage device capable of storing media content such as, for example, any type of volatile memory, any type of non-volatile memory, a database, etc. The media storage 122 may be a standalone storage device or may be integrated with the stored media interface 120. The media content stored in the media storage 122 may be full resolution media content programs, reduced size media content programs (e.g., media content intended for use as picture-in-picture), programs specifically for display on mobile devices, clips of media content programs, and/or other media types.

The billing interface 124 determines whether a user and/or device is authorized to access media cont Writ in response to a request received via the client interface 118. The billing interface 124 may additionally determine whether a consumer and/or device are/is authorized to access subscriber data networks (e.g., the internet). To these ends, the billing interface 124 accesses billing records stored in the billing storage 126. For example, the billing interface 124 may receive a username/password associated with a consumer and/or a serial number associated with the CPE 114 along with a request to access media content (e.g., content associated with HBO). The billing interface 124 attempts to retrieve one or more billing records associated with the username/password and/or the serial number from the billing storage 126. If one or more billing records exist, the billing interface 124 determines if the one or more billing records indicate(s) that the requesting device is authorized to access the requested media content (e.g., the consumer subscribes to HBO and has paid their bills). If the billing interface 124 determines that one or more records indicate(s) that the consumer is authorized to access the requested media content, the billing interface 124 sends a message to the client interface 118 indicating that the consumer is authorized to access the media content.

The example billing storage 126 is an accounting database associating consumer and/or device identification information with media content subscription information. The example billing storage 126 may additionally store information associated with a user's data network access subscription (e.g., internet access subscription) and/or wireless network access subscription cellular phone access subscription). In the illustrated example, the billing storage 126 is a standalone storage device. However, it will be understood by persons of ordinary skill in the art that the billing storage 126 may alternatively be integrated with the billing interface 124.

The "live" media interface 128 is a media content interface that handles the acquisition of media content from media content creators/distributors and the distribution of the "live" media content to consumers via the client interface 118. The "live" media content may be received from media content creators/distributors and immediately, or nearly immediately, transmitted to consumers. In other words, the "live" media content may not be stored in the telecommunication network 104 (e.g., media content stored in the media content storage 122). Of course, "live" media content may be live action content (e.g., new casts, sporting events, etc.) or previously recorded events. For example, while a basketball game may be recorded and received by the "live" media interface 128 as the game is played, or near the time that the game is played, a game show may be recorded, stored by the media content creator/distributor, and transmitted to the "live" media interface 128 at a time much later than the time that the game show was recorded. The "live" media content may be full resolution media content programs, reduced size media content programs (e.g., media content intended for use as picture-in-picture), programs specifically for display on mobile devices, clips of media content programs, and/or other media content.

The example wireless telecommunication network 106 is a cellular telecommunication network. The example wireless telecommunication network 106 receives requests for media content and/or lists of available media content from the mobile device 108 (e.g., HTML formatted requests, XML formatted requests, etc.) and transmits the requests to the client interface 118. The wireless telecommunication network 106 of the illustrated example receives media content from the client interface 118 and transmits the media content to the requesting mobile device 108. The wireless telecommunication network may be any type of cellular telecommunication network such as, for example, a Code Division Multiple Access (CDMA) circuitry, Global System for Mobile Communication (GSM), General Packet Radio Service (GPRS) circuitry, universal mobile telecommunication system (UNITS) circuitry, etc. Alternatively, the wireless telecommunication network 106 may use any other type of wireless communications network and/or protocol such as, for example, Bluetooth communications, any variety of IEEE 802.11 protocol communications, etc.

The mobile device 108 of the illustrated example (e.g., a cellular telephone) is communicatively coupled to the wireless telecommunication network 106. The mobile device 108 generates requests for media content and/or lists of available media content and transmits them via the wireless telecommunication network 106 to the client interface 118. The mobile device of the illustrated example transmits information about the consumer using the mobile device (e.g., a username and/or password) and/or information about the mobile device (e.g., a serial number or network identifier) along with the request. In addition, the mobile device 108 receives media content and/or lists of available media content from the client interface 118 via the wireless telecommunication network 106. The mobile device 108 presents the received media content and/or lists of available media content using presentation circuitry (e.g., speakers and/or a display screen). For example, a consumer using the mobile device may request presentation of an HBO program. The mobile device sends the request along with a serial number associated with the mobile device to the client interface 118 via the wireless telecommunication network 106. After determining that the mobile device 108 is authorized to receive the HBO program, the media content is transmitted to the mobile device via the wireless telecommunication network 106. The mobile device 108 receives the HBO program and shows the video content on a display screen and plays the audio content over speakers or attached headphones. For example, the mobile device may include a software application for decrypting and presenting media content programs. Alternatively, a software application for decrypting and presenting media content may be provided on a server for the mobile device to download and install.

An alternative implementation of the example telecommunication system 100 of FIG. 1 is discussed below in connection with FIG. 4.

Figure 2:
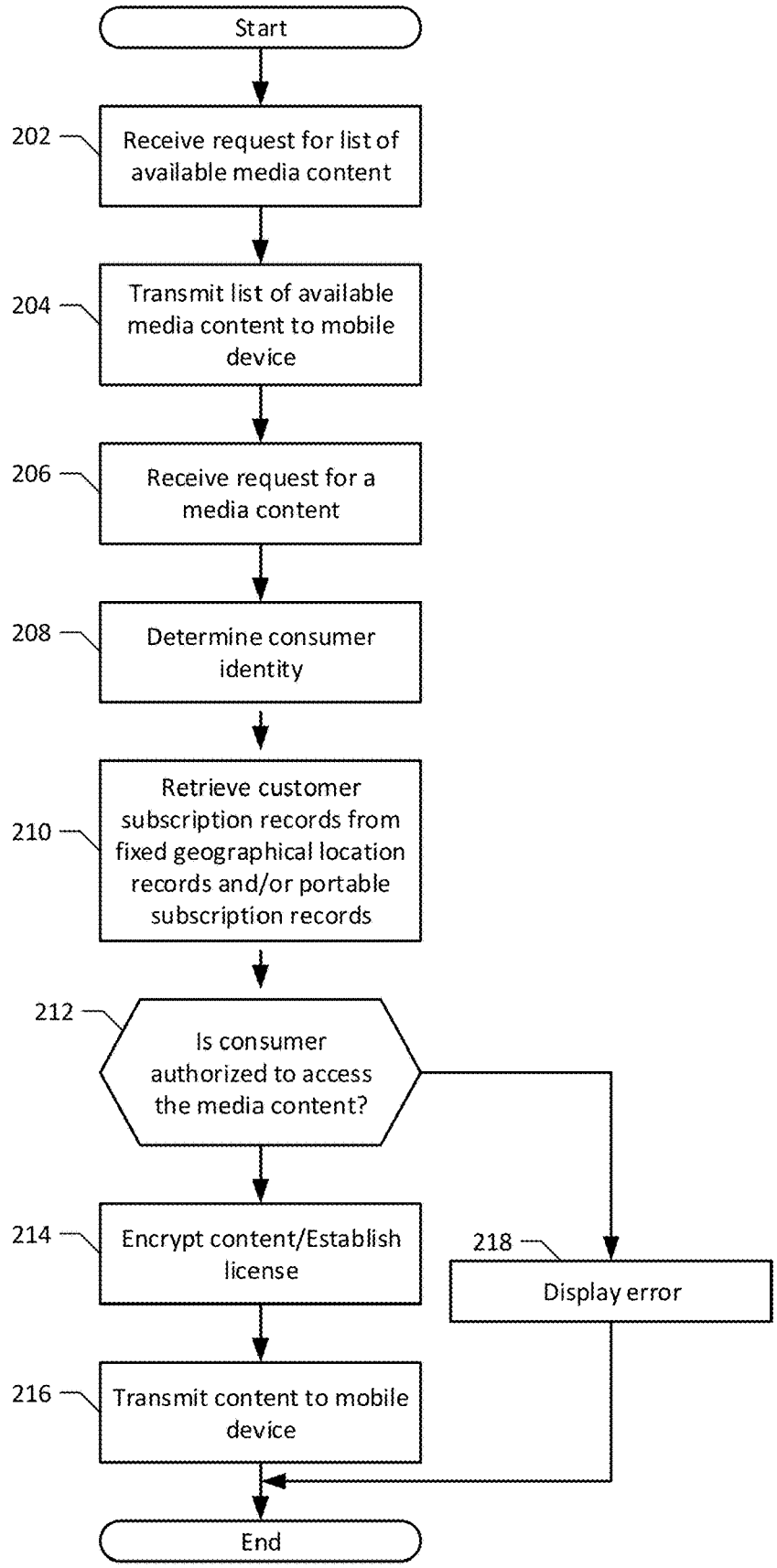
FIG. 2 is a flowchart representative of example machine readable instructions which may be executed to distribute media content.
Figure 3:
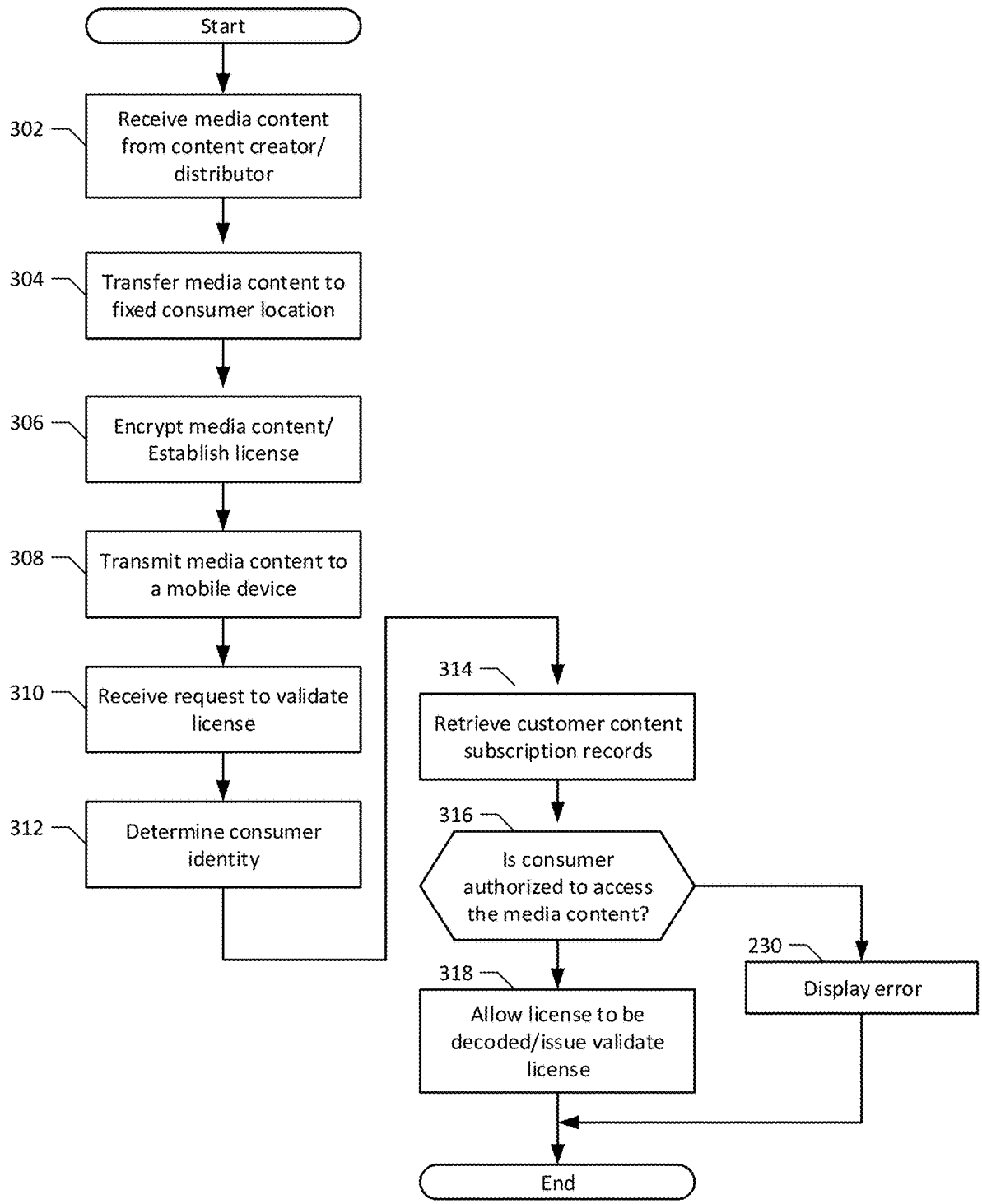
FIG. 3 is a flowchart representative of example machine readable instructions which may be executed to distribute media content.

A flowchart representative of example machine readable instructions for implementing the telecommunication network 104 of FIG. 1 is shown in FIGS. 2-3. In this example, the machine readable instructions comprise a program for execution by a processor such as the processor 9012 shown in the example computer 9000 discussed below in connection with FIG. 5. The program may be embodied in software stored on a tangible medium such as a CD-ROM, a floppy disk, a hard drive, a digital versatile disk (DVD), or a memory associated with the processor 9012, but persons of ordinary skill in the art will readily appreciate that the entire program and/or parts thereof could alternatively be executed by a device other than the processor 9012 and/or embodied in firmware or dedicated hardware in a well known manner. For example, any or all of the client interface 118, the stored media interface 120, the billing interface 124, and/or the "live" media interface 128 could be implemented by software, hardware, and/or firmware. Further, although the example program is described with reference to the flowcharts illustrated in FIGS. 2-3, persons of ordinary skill in the art will readily appreciate that many other methods of implementing the telecommunication network 104 may alternatively be used. For example, the order of execution of the blocks may be changed, and/or some of the blocks described may be changed, eliminated, or combined.

FIG. 2 is a flowchart representative of example machine readable instruction which may be executed for distributing media content. In the example machine readable instructions of FIG. 2, media content is transmitted to mobile devices on demand. In other words, media content is not transmitted to mobile devices until the mobile device requests the media content.

The execution of the example machine readable instructions of FIG. 2 begins when the client interface 118 receives a request for a list of available media content from a receiving device (e.g., the computer 116 or the mobile device 108) (block 202). The client interface prepares a list of media content available via the stored media interface 120 and/or the "live" media interface 128 and transmits the list to the mobile device (block 204). The client interface 118 then receives a request for media content from the mobile device (block 206). For example, after reviewing the list of available media content, a consumer using the mobile device 108 may transmit a request to view desired media content. The request includes consumer identification information (e.g., a username/password) and/or device identification information (e.g., a serial number for the mobile device).

After receiving the request for media content, the client interface 118 transmits the request and the identification information to the billing interface 124. The billing interface 124 determines the identity of the consumer and/or device by comparing the receiving identification information with information stored in the billing storage 126 (block 208). The billing interface 124 then retrieves media content subscription information associated with the determined identity from the billing storage 126 (block 210). In one example, the subscription information is subscription records associated with a fixed geographical location. For example, the subscription records may be subscription records associated with a subscription to media content at a house. The example subscription records may be associated with a subscription to a premium content channel (e.g., the HBO channel). In another example, the subscription records may be associated with both a geographically fixed location and the mobile device.

Next, the billing interface 124 compares the requested media content to subscription information associated with a fixed geographical location (e.g., a home or a business) to determine if the requesting device is authorized to access the requested media content (block 212). If the consumer and/or the device are not authorized to access the media content, the billing interface 124 transmits a notification (e.g., an access denied error message) the mobile device via the client interface 118 and the NTU 112 or the wireless communication network 106 (block 218). If the consumer and/or device are authorized to access the media content because of their geographical based subscription (e.g., a subscription associated with a fixed geographical location), the billing interface informs the client interface 118 that the requesting consumer and/or device are authorized to access the media content. The client interface then encrypts and/or establishes a license for the media content (block 214). Then, the client interface 118 transmits the encrypted and/or licensed media content to the mobile device (block 216).

FIG. 3 is a flowchart representative of example machine readable instruction which may be executed for distributing media content. In the example machine readable instructions of FIG. 3, media content is transmitted to receiving devices as it is received from media content creators/distributors. In other words, the media content is streamed to the receiving device from a media content creator/distributor. The receiving device may store the media content for later presentation or may present the media content as it is received. In the example process of FIG. 2, a consumer using the mobile device does not request that the media content is transmitted.

The execution of the example machine readable instructions of FIG. 3 begins when media content is received from a content creator/distributor via the "live" media interface 126 (block 302). The "live" media interface 128 transmits the media content to the CPE 114 via the client interface 118 and the NTU 112 (block 304). The CPE 114 may store the media content or present the media content on the television 110.

The client interface 118 then encrypts and/or licenses the media content block 306). The media content is licensed to be played only on devices that are authorized to receive and present the media content. For example, the media content may be licensed for playback on the computer 116 and/or the mobile device 108. The client interface 118 then transmits the media content the computer 116 via the NTU 112 and/or the mobile device 108 via the wireless telecommunication network 106 (block 308).

When the media content is received by the computer 116 and/or the mobile device 108, the computer 116 and/or the mobile device 108 will attempt to validate the license for playback by sending a request including identification information for the consumer and/or the device to the client interface 118. The client interface 118 receives the request to validate the license and transmits the request to the billing interface 124 to determine if the consumer and/or device are/is authorized to access the media content (block 310). The billing interface 124 determines the identity of the consumer and/or the device by comparing the received identification information to information stored in the billing storage 126 (block 312). The billing interface 124 then retrieves media content subscription information from the billing storage 126. The billing interface 124 compares the media content requested to billing records in the billing storage 126 to determine if the consumer and/or device are/is authorized to access the requested media content (block 316). If the consumer or device is not authorized to access the media content, the billing interface transmits an error the device via the client interface 118 and the NTU 112 or the wireless telecommunication network 106 (block 320). Additionally, the computer 116 or the mobile device 108 may provide a way for the consumer to subscribe to the media content. If the consumer and device is authorized to access the media content, the billing interface 124 transmits a notification to the computer 116 and/or the mobile device 108 via the client interface 118 and the NTU 112 or the wireless telecommunication network 106 indicating that the media content may be presented (block 318).

Figure 4:
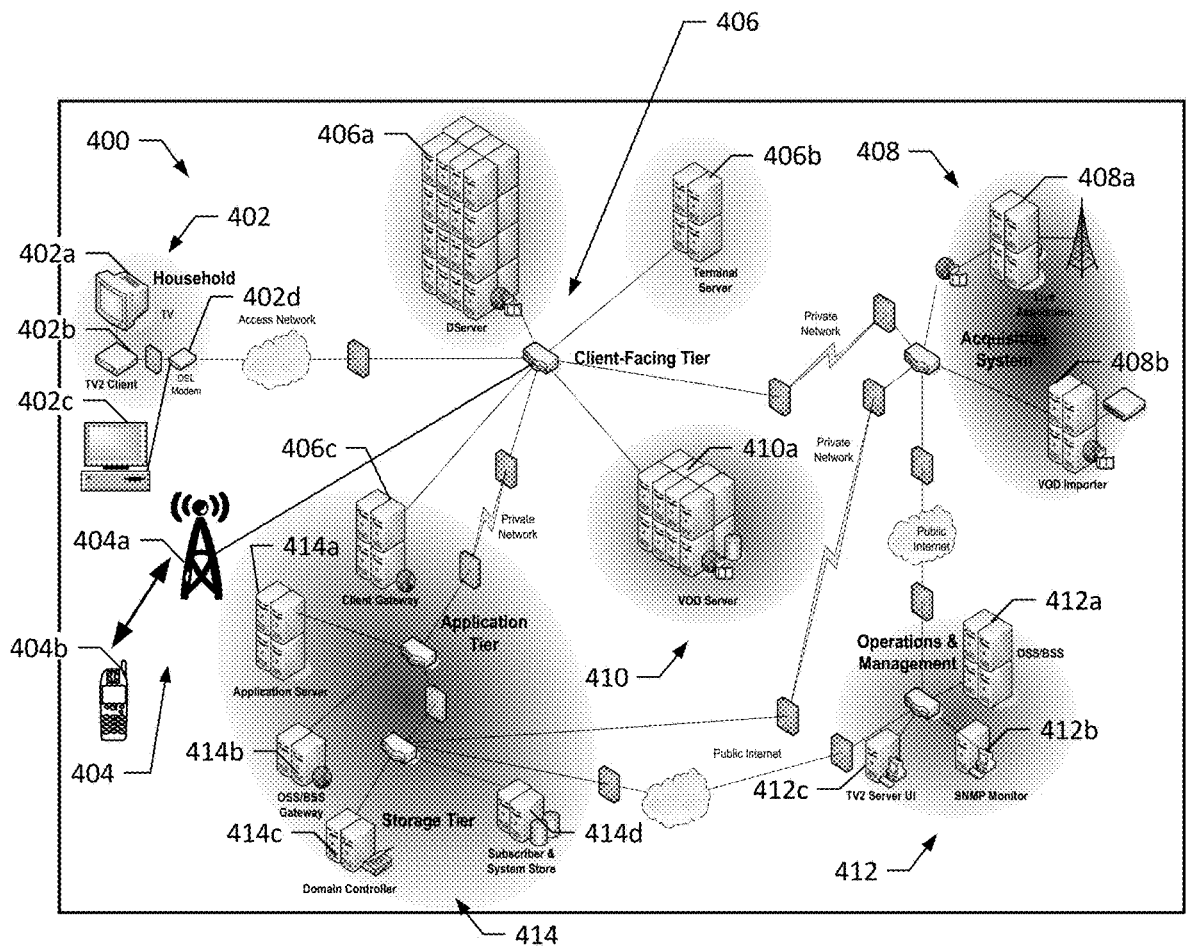
FIG. 4 illustrates an example telecommunication system for providing internet protocol television (IPTV) media content.

FIG. 4 illustrates an example telecommunication system 400 for providing internee protocol television (IPTV) media content. In general, the telecommunication system 400 includes a household 402, a wireless telecommunication system 404, a client facing tier 406, an acquisition system 408, a video on demand system 410, an operations and management system 412, and an application and storage tier 414.

In general, the telecommunication system 400 receives media content from media content creators/distributors via the acquisition system 408. The media content is transmitted to the client facing tier 406. In the client facing tier, the media content is either transmitted to the video on demand system 410 for storage or transmitted to the household 402 or the wireless telecommunication system 404. The application and storage tier 414 verifies that consumers connecting to the telecommunication system 400 are authorized to access media content and other services provided by the telecommunication system 400 (e.g., internet access, pay per view access, etc.) The application and storage tier additionally transmits usage information (e.g., purchase of a pay per view movie) to the operations and management system 412. The operations and management system provides an interface for the telecommunication system 400 for use by technicians. In addition, the operations and management system 412 tracks billing information associated with media content creators/distributors.

The household 402 is similar to the household 102 of FIG. 1. The household 402a includes a television 402a, a CPE 402b, a computer 402c, and a NTU 402d, which may be similar the television 110, the CPE 114, the computer 116, and the NTU 112 of FIG. 1, respectively. The devices in the household 402 receive IPTV media content similar to the media content received by the household 102 of FIG. 1.

The wireless telecommunication system 404 is similar to the wireless telecommunication system 106 and the mobile device 108 of FIG. 1. The wireless telecommunication system 404 includes a cellular communications network 404a and a cellular telephone 404b, which may be similar to the wireless telecommunication system 106 and the mobile device 108 of FIG. 1, respectively.

The client facing tier 406 is similar to the client interface 118 of FIG. 1. The client facing tier 406 comprises a DServer 406a, a terminal server 406b, and a client gateway 406c. The DServer 406a temporarily stores media content as the media content s transmitted to the household 402 and/or the wireless telecommunication system 404. The terminal server 406b provides applications that may be executed remotely from the CPE 402b, the computer 402c, and/or the cellular telephone 404b. The client gateway 402c communicates with the CPE 402b and the computer 402c via the NTU 402d and the cellular telephone 404b via the cellular communications network 404a.

The acquisition system 408 comprises a live acquisition server 408a and a video on demand (VOD) importer 408b. The live acquisition server 408a acquires media content from media content creators/distributors, encodes media content, encrypts media content, and encapsulates media content for delivery to the household 402 and/or the wireless telecommunication network 404 via remote transmission protocols. The VOD importer 408b receives VOD content from media content creators/distributors and stores the media content on the VOD server 410a.

The operations and management system 412 comprises an operational support system/business support system (OSS/BSS) 412a, a simple network management protocol (SNMP) monitor 412b, and a TV2 management system 412c. The OSS/BSS 412a stores billing information associated with media content creators/distributors. The SNMP monitor 412b provides a user interface for technicians to access system errors and messages. The TV2 management system 412c provides management tools for technicians to configure the telecommunication system 400.

The application and storage tier 414 comprises an application server 414a, an OSS/BSS gateway 414b, a domain controller 414c, and a subscriber and system store 414d. The application server 414a provides user interface applications for the CPE 402b, For example, the application server 414a provides a user interface for access to video on demand media content. The OSS/BSS gate 414b provides an interface between the operations and management system 412 and the application and storage tier 414. The domain controller 414c provides network services such as user authentication, current time announcement, etc. The subscriber and system store 414d stores information associated with consumer media content subscriptions and electronic program guide data. The subscriber and system store 414d may be similar to the billing storage 126 of FIG. 1.

Figure 5:
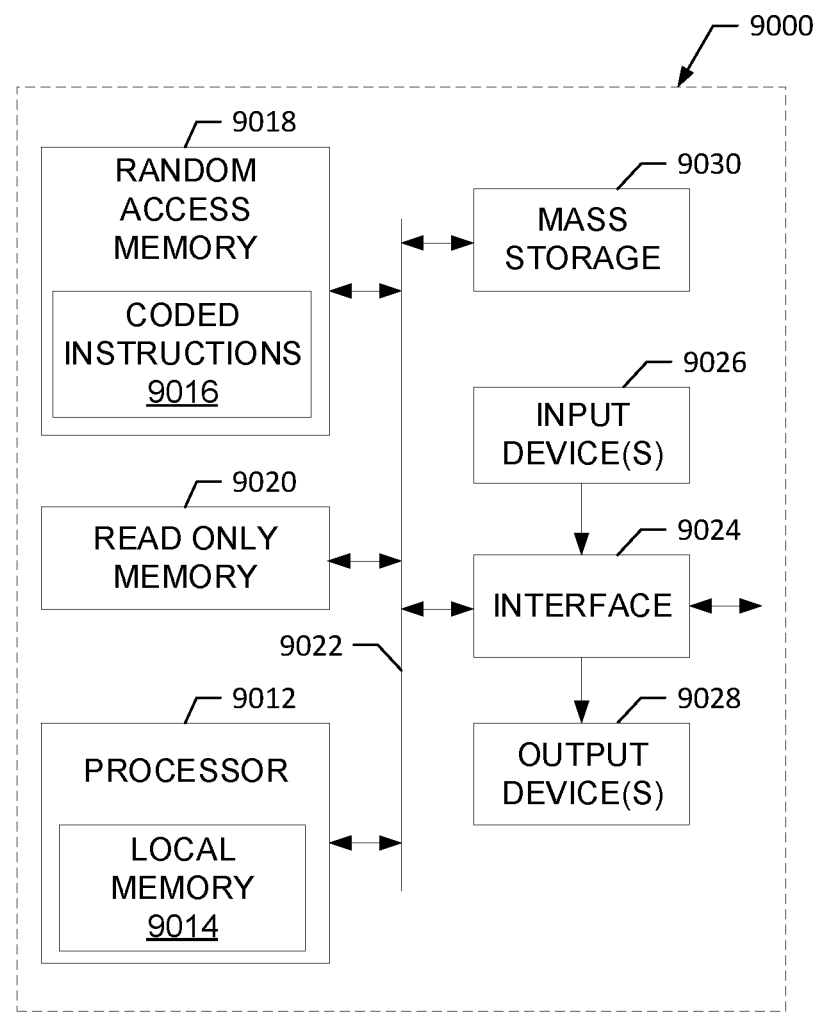
FIG. 5 is an example processor system that may execute the machine readable instructions represented by FIGS. 2 and/or 3 to implement the example methods and apparatus described herein.

FIG. 5 is a block diagram of an example computer 9000 capable of executing the machine readable instructions represented by FIGS. 2 and/or 3 to implement the apparatus and/or methods disclosed herein. The computer 9000 can be, for example, the NTU 112, the CPE 114, the computer 116, or the telecommunication network 104 and/or any part thereof.

The system 9000 of the instant example includes a processor 9012 such as a general purpose programmable processor. The processor 9012 includes a local memory 9014, and executes coded instructions 9016 present in the local memory 9014 and/o another memory device. The processor 9012 may execute, among other things, the machine readable instructions illustrated in FIGS. 2 and 3. The processor 9012 may be any type of processing unit, such as a microprocessor from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 9012 is in communication with a main memory including a volatile memory 9018 and a non-volatile memory 9020 via a bus 9022. The volatile memory 9018 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 9020 may be implemented by flash memory and/or any other desired type of memory device. Access to the main memory 9018, 9020 is typically controlled by a memory controller (not shown) in a conventional manner.

The computer 9000 also includes a conventional interface circuit 9024. The interface circuit 9024 may be implemented by any type of well known interface standard, such as an Ethernet interface, a universal serial bus (USB), and/or a third generation input/output (3GIO) interface.

One or more input devices 9026 are connected to the interface circuit 9024. The input device(s) 9026 permit a user to enter data and commands into the processor 9012. The input device(s) can be implemented by, for example, a keyboard, a mouse, a touchscreen, a track-pad, a trackball, isopoint and/or a voice recognition system.

One or more output devices 9028 are also connected to the interface circuit 9024. The output devices 9028 can be implemented, for example, by display devices (e.g., a liquid crystal display, a cathode ray tube display (CRT), a printer and/or speakers). The interface circuit 9024, thus, typically includes a graphics driver card.

The interface circuit 9024 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 9000 also includes one or more mass storage devices 9030 for storing software and data. Examples of such mass storage devices 9030 include floppy disk drives, hard drive disks, compact disk drives and digital versatile disk (DVD) drives.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

Although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus comprising:
   a media interface to transmit media to a wired network termination unit via a wired communication path of a service provider network, the media interface to also transmit the media in an encrypted format to a wireless communication device via a wireless communication path;
   a client interface to receive a request from the wireless communication device for authorization to present the media;
   a database to store an association of the wireless communication device and the wired network termination unit; and
   a record interface to, in response to the request for authorization:
      query the database based on an identifier of the wireless communication device to determine whether the wired network termination unit is authorized to access the media via the wired communication path;
      in response to determining that the wired network termination unit is authorized to access the media via the wired communication path, create a license to authorize the wireless communication device to decrypt and present the media that was transmitted to the wireless communication device prior to receiving the request from the wireless communication device, wherein at least one of: the client interface or the record interface is implemented using hardware, and the media does not include the association of the wireless communication device and the wired network termination unit; and
      provide the license to the wireless communication device.

2. The apparatus as defined in claim 1, further including a video on demand server.

3. The apparatus as defined in claim 2, wherein the video on demand server is to receive the media from at least one of: a media creator or a media distributor.

4. The apparatus as defined in claim 1, further including a media storage to store the media.

5. The apparatus as defined in claim 1, wherein the wired network termination unit is at least one of: a cable modem, a satellite receiver, an optical network terminal unit, or a digital subscriber line modem.

6. The apparatus as defined in claim 1, wherein the record interface includes at least one of: an application server, an operational support system/business support system gateway, a domain controller, a subscriber and system store, an operational support system/business support system, or a simple network management protocol monitor.

7. The apparatus as defined in claim 1, further including at least one of: a live acquisition server or a video on demand importer.

8. A method to distribute media, the method comprising:
transmitting the media to a wired network termination unit via a wired communication path of a service provider network;
transmitting the media in an encrypted format to a wireless communication device via a wireless communication path;
storing a first record associating an identifier of the wireless communication device with an identifier of the wired network termination unit; and
in response to a request for authorization to present the media at the wireless communication device:
  accessing the first record based on the identifier of the wireless communication device to identify the identifier of the wired network termination unit;
  identifying a second record associated with the wired network termination unit based on the identifier of the wired network termination unit, the media not including either of the first record or the second record;
  determining that the wired network termination unit is authorized to access the media based on the second record;
  in response to determining that the second record authorizes the wired network termination unit to access the media, creating a license to authorize the wireless communication device to decrypt and present the media that was transmitted to the wireless communication device prior to receiving the request from the wireless communication device; and
  providing the license to the wireless communication device.

9. The method as defined in claim 8, further including in response to a request for a list of available media, transmitting the list of available media to the wireless communication device.

10. The method as defined in claim 9, wherein the authorizing of the wireless communication device includes an authorization for transmitting the list of available media to the wireless communication device.

11. The method as defined in claim 8, wherein the media has a different format when received at the wired network termination unit than when received at the wireless communication device.

12. The method as defined in claim 8, further including:
transmitting a notification to the wireless communication device if the wireless communication device is not authorized to access the media.

13. The method as defined in claim 8, wherein the media is an internet protocol television media.

14. The method as defined in claim 8, wherein the wired network termination unit is at least one of: a cable modem, a satellite receiver, an optical network terminal unit, or a digital subscriber line modem.

15. The method as defined in claim 8, wherein the wireless communication device is at least one of: a cellular telephone, a smart phone, a portable device or a handheld device.

16. The method as defined in claim 8, wherein the wireless communication device is transported from a first location to a second location by a consumer.

17. The method as defined in claim 9, wherein the authorizing of the transmitting of the list of available media to the wireless communication device occurs after transmitting the media to the wireless communication device.

18. A tangible computer readable memory including instructions that, when executed by a machine, cause the machine to perform operations, the operations comprising:
transmitting media to a wired network termination unit via a wired communication path of a service provider network;
transmitting the media in an encrypted format to a wireless communication device via a wireless communication path;
storing a first record associating an identifier of the wireless communication device with an identifier of the wired network termination unit; and
in response to a request from the wireless communication device for authorization to present the media:
  accessing the first record based on the identifier of the wireless communication device to identify the identifier of the wired network termination unit;
  identifying a second record associated with the wired network termination unit based on the identifier of the wired network termination unit, the media not including either of the first record or the second record;
  determining that the wired network termination unit is authorized to access the media based on the second record;
  in response to determining that the second record authorizes the wired network termination unit to access the media, creating a license authorizing the wireless communication device to decrypt and present the media that was transmitted to the wireless communication device prior to receiving the request from the wireless communication device; and
  initiating transmission of the license to the wireless communication device.

19. The tangible computer readable memory as defined in claim 18, wherein the wireless communication device is at least one of: a cellular telephone, a smart phone, a portable device or a handheld device.

20. The tangible computer readable memory as defined in claim 18, further including:
in response to a request for a list of available media, transmitting the list of available media to the wireless communication device; and wherein the authorizing of the wireless communication device includes an authorization for transmitting the list of available media to the wireless communication device.

* * * * *